(12) United States Patent
Sung (10) Patent No.: US 11,391,433 B2
(45) Date of Patent: Jul. 19, 2022

(54) APPARATUS AND METHOD FOR CONTROLLING LIGHT DISTRIBUTION USING STEERING INFORMATION

(71) Applicant: HYUNDAI MOBIS Co., Ltd., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 230 days.

(21) Appl. No.: 15/975,291

(22) Filed: May 9, 2018

(65) Prior Publication Data
US 2018/0347778 A1 Dec. 6, 2018

(30) Foreign Application Priority Data

Jun. 2, 2017 (KR) .................. 10-2017-0068983

(51) Int. Cl.
*F21S 41/60* (2018.01)
*B60W 10/30* (2006.01)
(Continued)

(52) U.S. Cl.
CPC .............. *F21S 41/60* (2018.01); *B60Q 1/12* (2013.01); *B60W 10/30* (2013.01);
(Continued)

(58) Field of Classification Search
CPC combination set(s) only.
See application file for complete search history.

(56) References Cited

U.S. PATENT DOCUMENTS 8,017,898 B2 * 9/2011 Lu ................ B60Q 1/1423
250/208.1
9,656,596 B2 5/2017 Uesugi et al.
(Continued)

FOREIGN PATENT DOCUMENTS

DE 102009054249 A1 5/2011
JP 2004-268830 A 9/2004
(Continued)

OTHER PUBLICATIONS

Office Action of corresponding Japanese Patent Application No. 2018-101471—4 pages (dated Jul. 2, 2019).
(Continued)

*Primary Examiner* — Christian Chace
*Assistant Examiner* — Amelia Vorce
(74) *Attorney, Agent, or Firm* — NovoTechIP International PLLC (57) ABSTRACT

Provided is an apparatus for controlling light distribution using steering information, the apparatus including a steering information detector configured to detect an amount of change of steering information sensed through a steering sensor that senses the steering information, a determiner configured to determine whether the amount of change of the steering information detected through the steering information detector is greater than or equal to a predetermined critical value and determine a direction in which the steering information is changed, and a controller configured to increase or decrease a margin of a shadow zone of a headlamp according to the amount of change of the steering information when the amount of change of the steering information is determined by the determiner to be greater than or equal to the predetermined critical value.

8 Claims, 5 Drawing Sheets

(51) Int. Cl.
*B60Q 1/14* (2006.01)
*B60Q 1/12* (2006.01)

(52) U.S. Cl.
CPC .. *B60Q 2300/056* (2013.01); *B60Q 2300/122* (2013.01); *B60Q 2300/124* (2013.01); *B60W 2510/205* (2013.01)

(56) References Cited

U.S. PATENT DOCUMENTS

| | | | |
|---|---|---|---|
| 9,896,022 B1* | 2/2018 | Pertsel | G06K 9/00825 |
| 10,202,077 B2* | 2/2019 | Gupta | H04N 17/00 |
| 2003/0107323 A1* | 6/2003 | Stam | F21S 41/62 |
| | | | 315/82 |
| 2006/0044783 A1* | 3/2006 | Morishita | B60Q 1/12 |
| | | | 362/37 |
| 2010/0214791 A1* | 8/2010 | Schofield | B60Q 1/1423 |
| | | | 362/466 |
| 2013/0201705 A1* | 8/2013 | Schmidt | B60Q 1/122 |
| | | | 362/466 |
| 2014/0022070 A1* | 1/2014 | Golomb | B60Q 1/0082 |
| | | | 340/475 |
| 2014/0043473 A1* | 2/2014 | Gupta | H04N 17/00 |
| | | | 348/135 |
| 2014/0218952 A1* | 8/2014 | Zhuang | B60Q 1/12 |
| | | | 362/523 |
| 2015/0003087 A1* | 1/2015 | Futamura | B60Q 9/008 |
| | | | 362/466 |
| 2015/0009695 A1* | 1/2015 | Christmas | F21S 41/285 |
| | | | 362/466 |
| 2016/0185276 A1* | 6/2016 | Tanaka | F21S 41/657 |
| | | | 362/466 |
| 2017/0008447 A1* | 1/2017 | Fukui | B60Q 1/1446 |
| 2017/0057403 A1 | 3/2017 | Uesugi et al. | |
| 2017/0182931 A1* | 6/2017 | Son | B60Q 1/1423 |
| 2017/0334337 A1* | 11/2017 | Ohno | H04N 9/3161 |
| 2018/0043820 A1* | 2/2018 | Murakami | H05B 45/14 |
| 2018/0319317 A1* | 11/2018 | Plank | B60Q 1/143 |
| 2019/0039507 A1* | 2/2019 | Higgins-Luthman | |
| | | | B60Q 1/245 |
| 2020/0001777 A1* | 1/2020 | Hiroi | B60Q 1/1423 |
| 2020/0032976 A1* | 1/2020 | Shimada | B60Q 1/14 |

FOREIGN PATENT DOCUMENTS

| | | |
|---|---|---|
| JP | 2011-016505 A | 1/2011 |
| JP | 2013-184595 A | 9/2013 |
| JP | 2014-101069 A | 6/2014 |
| JP | 2017-043244 A | 3/2017 |
| KR | 10-2012-0136961 A | 12/2012 |

OTHER PUBLICATIONS

Office Action of corresponding Korean Patent Application No. 10-2017-0068983—8 pages (dated Jun. 1, 2020).
Office Action of corresponding Japanese Patent Application No. 2018-101471—3 pages (dated Mar. 24, 2020).
Office Action dated Nov. 15, 2021 in corresponding German Patent Application No. 102018207104.

* cited by examiner

FIG. 1A

SEND POSITION
INFORMATION OF
FRONT VEHICLE

FIG. 1B

TRACKING SPEED
LOWERED ON
CURVED ROAD

APPARATUS AND METHOD FOR CONTROLLING LIGHT DISTRIBUTION USING STEERING INFORMATION

CROSS-REFERENCE TO RELATED APPLICATION

This application claims priority to and the benefit of Korean Patent Application No. 2017-0068983, filed on Jun. 2, 2017, the disclosure of which is incorporated herein by reference in its entirety.

BACKGROUND

1 Field of the Invention

The present disclosure relates to an apparatus and method for controlling light distribution using steering information, and more particularly, to an apparatus and method for controlling light distribution using steering information in which steering information of a vehicle is detected and a glare free area of an adaptive driving beam (ADB) lamp is controlled through the detected steering information.

2. Discussion of Related Art

Generally a headlamp refers to a lamp that illuminates an area in front of a vehicle to ensure safety of night driving of the vehicle.

Such a headlamp is not concerned with glare given to opposing vehicles and preceding vehicles, and thus the headlamp has a limitation in preventing glare from being given to the opposing vehicles and preceding vehicles.

In order to prevent giving glare to opposing vehicles and preceding vehicles, an adaptive driving beam (hereinafter, referred to as "ADB") system has been developed.

A conventional ADB system includes various sensors and cameras to acquire information about a vehicle. That is, the conventional ADB system acquires environmental information and front vehicle information by capturing images through the camera, analyzes the environmental information and the front vehicle information 100% dependent on a camera image processing algorithm, and controls a margin of a shadow zone of the headlamp.

Here, the environmental information refers to information about a surrounding environment recognizable by the camera (a street light, a tunnel, and the number of vehicles), and the front vehicle information refers to individual information about a preceding vehicle and an opposing vehicle that are measured by the camera (a position, a distance, and the like).

However, such a conventional camera-based ADB system is usable on a straight road in which a front vehicle is not greatly changed, but is not usable on a curved road in which a front vehicle is greatly changed. That is, in a conventional ADB system based on an image processing technology for ADB control, it is not easy to determine an accurate position of a front vehicle, as shown in FIG. 1A to FIG. 1D, so that an estimation speed is significantly lowered.

In addition, in the conventional camera-based ADB system, a pulse width modulation (PWM) of a light source and external light sources, such as street lights, lights in urban areas, and the like, become factors that can lower accuracy of the camera image processing.

As described above, the conventional ADB system based on a camera image processing algorithm has difficulty in preventing glare from being given to opposing vehicles or preceding vehicles due to the limitation of camera recognition speed on a curved road section in which the headlamp has an aiming position abruptly changed.

In addition, the ADB system requires individual aiming of an ADB light emitting diode (LED) headlamp as ADB light distribution regulations, and the aiming of the ADB lamp is necessary to form an accurate glare free area.

SUMMARY OF THE INVENTION

The present disclosure is directed to providing an apparatus and method capable of preventing glare from being given to opposing vehicles even in a condition of an abrupt change in position by controlling a glare free area of an adaptive driving beam (ADB) according to the amount of change in steering information of a vehicle.

The technical objectives of the present disclosure are not limited to those disclosed above, and other objectives may become apparent to those of ordinary skill in the art on the basis of the following description.

One aspect of the present disclosure provides an apparatus for controlling light distribution using steering information, the apparatus including: a steering information detector configured to detect an amount of change of steering information sensed through a steering sensor that senses the steering information; a determiner configured to determine whether the amount of change of the steering information detected through the steering information detector is greater than or equal to a predetermined critical value and determine a direction in which the steering information is changed; and a controller configured to increase or decrease a margin of a shadow zone of a headlamp according to the amount of change of the steering information when the amount of change of the steering information is determined by the determiner to be greater than or equal to the predetermined critical value.

Another aspect of the present disclosure provides a method of controlling light distribution using steering information, the method including: detecting an amount of change of steering wheel angle (SWA) information of steering information sensed through a steering sensor that senses the steering information; determining whether the detected amount of change of the steering information is greater than or equal to a predetermined critical value and determining a direction in which the steering information is changed; and increasing or decreasing a margin a shadow zone of a headlamp according to the amount of change of the steering information when the amount of change of the steering information is determined to be greater than or equal to the predetermined critical value in the determining.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above and other advantages and a scheme for achieving advantages of the present disclosure will become readily apparent with reference to the following detailed description when considered in conjunction with the accompanying drawings. However, the scope of the present disclosure is not limited to such embodiments, and the present disclosure may be realized in various forms. The embodiments to be described below are provided so that the present disclosure may be thorough and complete and may fully convey the scope of the disclosure to those skilled in the art. The present disclosure is defined only by the scope of the appended claims. Meanwhile, the terms used herein are used to aid in the explanation and understanding of the present disclosure and are not intended to limit the scope spirit of the present disclosure.

It should be understood that the singular forms "a," "an," and "the" include plural references unless the context clearly dictates otherwise. The terms "comprises," "comprising," "includes," and/or "including," when used herein, specify the presence of components, steps, operations, and/or elements, but do not preclude the presence or addition of one or more other components, steps, operations, and/or elements.

Figure 1A:
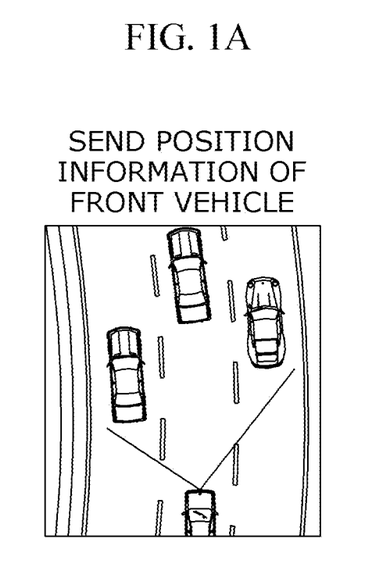
FIG. 1A to FIG. 1D is a functional block diagram for describing a tracking speed on a curved road through camera image processing according to a conventional camera-based adaptive driving beam (ADB) system.
Figure 1B:
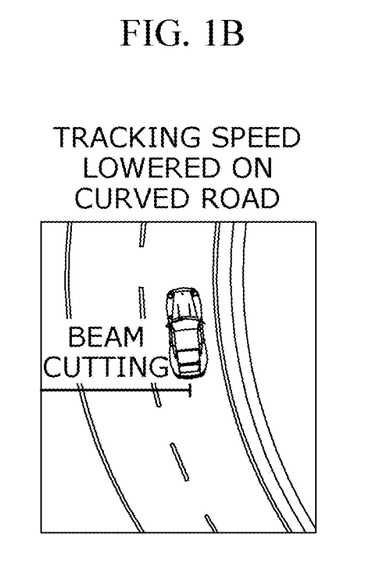
Figure 1C:
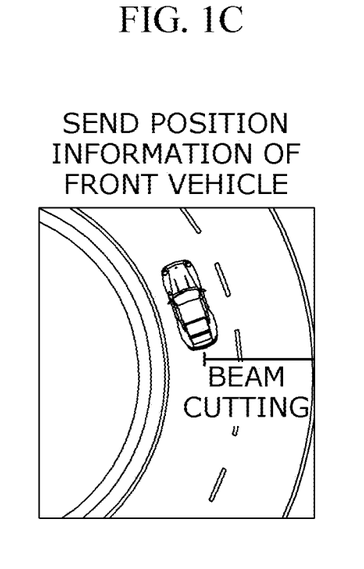
Figure 1D:
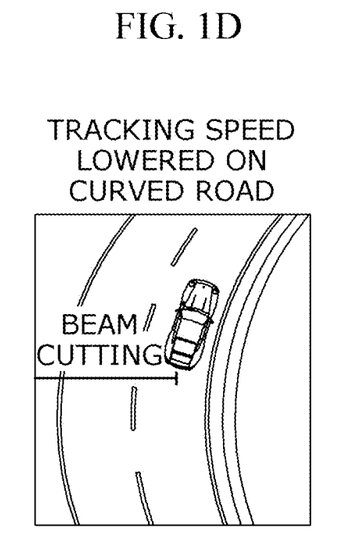
Figure 2:
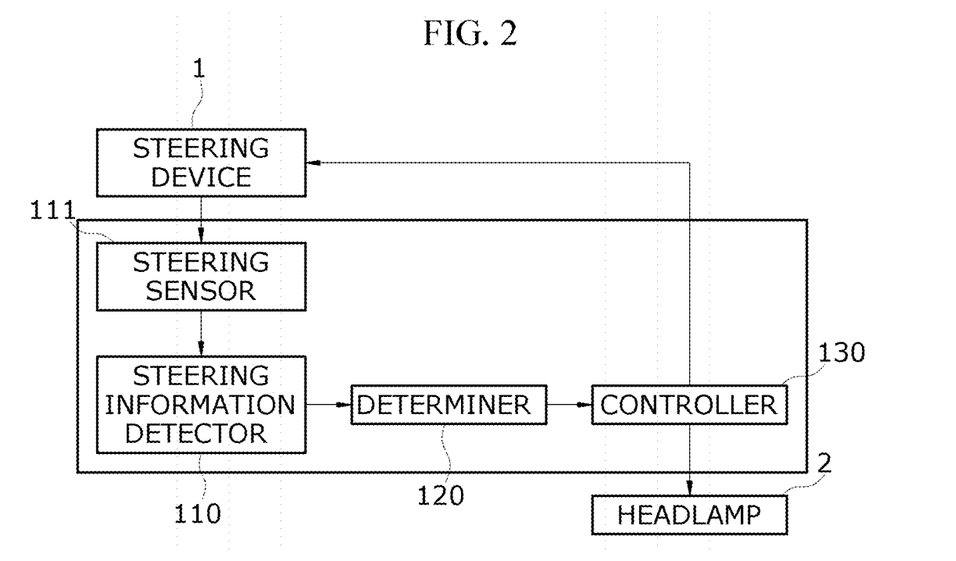
FIG. 2 is a functional block diagram for describing an apparatus for controlling light distribution using steering information according to an embodiment of the present disclosure.

Hereinafter, preferred embodiments of the present disclosure will be described in detail with reference to the accompanying drawings. FIG. 2 is a function block diagram for describing an apparatus for controlling light distribution using steering information according to an embodiment of the present disclosure.

Referring to FIG. 2, the apparatus for controlling light distribution using steering information according to the embodiment of the present disclosure includes a steering information detector 110, a determiner 120, and a controller 130.

The steering information detector 110 detects an amount of change of steering information sensed through a steering sensor that senses the steering information. The steering sensor employed for the embodiment of the present disclosure senses a rotation angle or a rotation speed of a steering device 1 and provides the sensed steering information to the determiner 120.

The determiner 120 determines whether the amount of change of the steering information detected through the steering information detector 110 is greater than or equal to a predetermined critical value and determines a direction of the changed steering information.

The controller 130 increases or decreases a margin of a shadow zone of a headlamp 2 according to the amount of change of the steering information when the amount of change of the steering information is determined to be greater than or equal to the predetermined critical value by the determiner 120. The headlamp 2 employed for the embodiment of the present disclosure may have a shadow zone thereof adjusted to prevent giving glare to opposing vehicles or preceding vehicles according to an existing adaptive driving beam (ADB) control logic.

According to the embodiment of the present disclosure, information of the steering device 1 of the vehicle is detected, and the detected steering information is used to control the margin of the shadow zone of the headlamp 2 so that even at a curved road at which an aiming position of the headlamp 2 is abruptly changed giving of glare to opposing vehicles is prevented while ensuring vision of a driver.

Hereinafter, a process in which the apparatus for controlling light distribution using steering information according to the embodiment of the present disclosure operates will be described with reference to FIG. 2. Preferably, the apparatus for controlling light distribution using steering information according to the embodiment of the present disclosure may be mounted on a vehicle.

First, a steering sensor is installed on a handle or the steering device 1 of the vehicle to sense the handle or the steering device 1.

When the vehicle is driven on a straight road, the handle of the vehicle changes within a predetermined amount of change of steering information.

In this state, the determiner 120 determines that a change in the steering information provided from the steering sensor is not greater than or equal to the predetermined critical value. According to the present embodiment, as the steering information, steering wheel angle (SWA) information is used to determine whether the change in the steering information is greater than or equal to the predetermined critical value, but according to another embodiment of the present disclosure, steering wheel speed (SWS) information may be used therefor.

Accordingly, the controller 130 maintains a current margin of the shadow zone of the headlamp 2 without increasing or decreasing the margin of the shadow zone of the headlamp.

When the vehicle enters a curved road, a driver turns the handle so that the SWA information of the steering device 1 is changed.

Then, the steering information detector 110 may detect the amount of change of the steering information sensed through the steering sensor, and the determiner 120 may determine whether the amount of change of SWA information (i.e., steering information) is greater than or equal to the predetermined critical value.

When the amount of change of SWA information (steering information) is determined to be greater than or equal to the predetermined critical value by the determiner 120, the controller 130 increases or decreases the margin of the shadow zone of the headlamp 2 according to the amount of change of the steering information.

As described above, according to the embodiment of the present disclosure, the margin of the shadow zone of the headlamp 2 is increased or decreased on the basis of the steering information, thereby rapidly performing control of the margin of the shadow zone of the headlamp 2 and preventing the occurrence of glare being given to opposing vehicles or preceding vehicles due to a low estimation speed on the curved road, as shown in FIG. 1A to FIG. 1D, which is a limitation of a conventional camera-based ADB system.

The controller 130 employed for the embodiment of the present disclosure increases the margin of the shadow zone located in a direction opposite a direction in which the steering information is changed in proportion to an extent to which the steering information is changed. When a glare free area (hereinafter, referred to as "GFA") expands, the GFA expands from a basic margin of the shadow zone to a maximum margin of the shadow zone, and when the GFA that reached the maximum margin of the shadow zone is reduced, the GFA is reduced at a speed lower than that of the expansion.

Accordingly, the controller 130 employed for the embodiment of the present disclosure may effectively prevent glare from being given to opposing vehicles and preceding vehicles when the GFA expands, and may mitigate dazzling that a driver may experience when the GFA is reduced.

In addition, the controller 130 employed for the embodiment of the present disclosure increases or decreases the margin of the shadow zone of the headlamp 2, which is located in a direction opposite the direction in which the steering information is changed.

As described above, according to the embodiment of the present disclosure, the margin of the shadow zone of the headlamp 2, which is located in the direction opposite the direction in which the steering information is changed, is increased or decreased, thus preventing the occurrence of glare being maximally given to opposing vehicles when a steering direction of a subject vehicle is opposite a driving direction of a front vehicle.

Hereinafter, the apparatus for controlling light distribution using steering information according to the embodiment of the present disclosure will be described with reference to FIG. 3.

Figure 3:
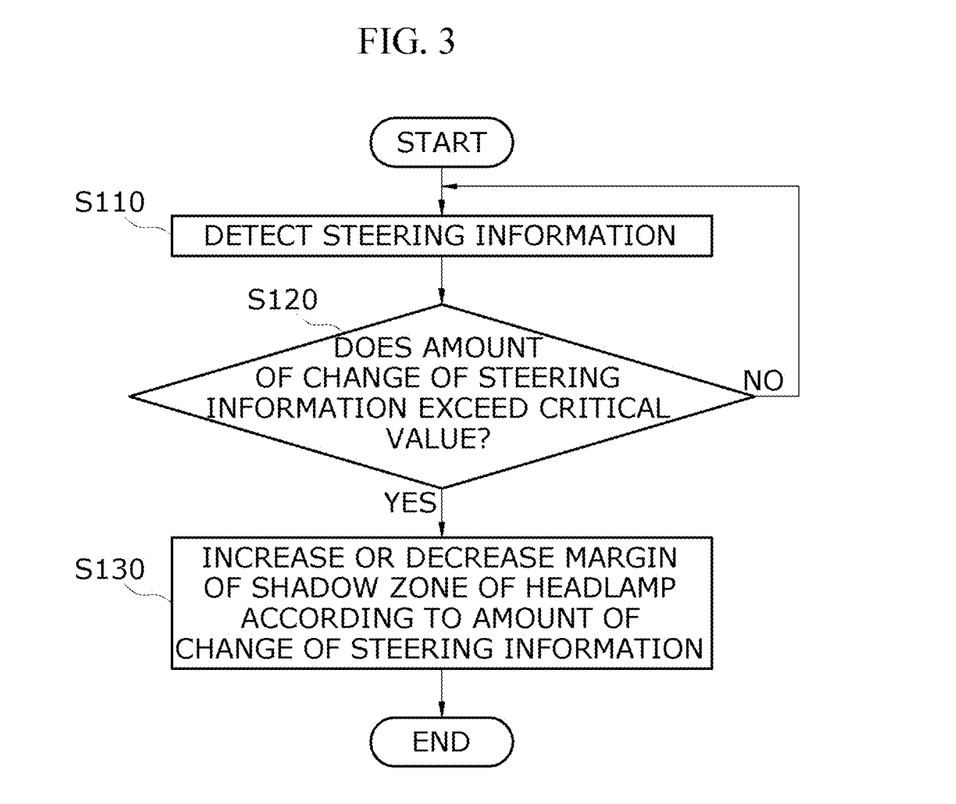
FIG. 3 is a flowchart for describing a method of controlling light distribution using steering information according to an embodiment of the present disclosure.

Referring to FIG. 3, preferably, the apparatus for controlling light distribution using steering information according to the embodiment of the present disclosure is operated by a processor for controlling an apparatus for controlling light distribution using steering information, and the processor may be used as an electronic control unit (ECU) for controlling a vehicle.

First, the amount of change of SWA information of steering information sensed through a steering sensor that senses the steering information is detected (S110). According to the embodiment of the present disclosure, the steering information is SWA information, but according to another embodiment of the present disclosure, SWS information may be used as the steering information.

Then, whether the detected amount of change of the steering information is greater than or equal to a predetermined critical value and a direction in which the steering information is changed are determined (S120).

When the amount of change of the steering information is determined to be greater than or equal to the predetermined critical value in operation S120, the controller 130 increases or decreases a margin of a shadow zone of the headlamp 2 according to the amount of change of the steering information (S130). In the increase or decrease of the margin of the shadow zone of the headlamp 2 according to the present embodiment (S130), preferably, the margin of a shadow zone of an area of the headlamp 2, which is located in a direction opposite the direction in which the steering information is changed, may be increased or decreased.

Figure 4:
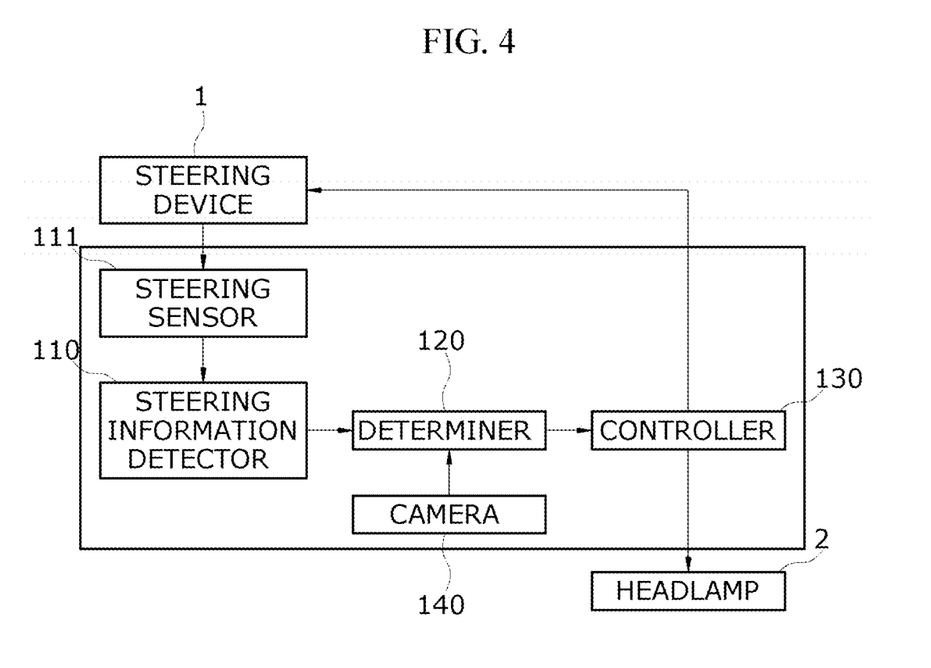
FIG. 4 is a flowchart for describing an apparatus for controlling light distribution using steering information according to another embodiment of the present disclosure.

FIG. 4 is a flowchart for describing an apparatus for controlling light distribution using steering information according to another embodiment of the present disclosure.

Referring to FIG. 4, the apparatus for controlling light distribution using steering information according to the present embodiment may, in addition to the construction of the above-described embodiment, further include a camera 140 configured to acquire position information of a front vehicle and calculate an amount of change of a position of the front vehicle from the position information.

Herein, details of the steering sensor and the steering information detector 110 which have been described above will be omitted.

First, the camera 140 acquires position information of a front vehicle and calculates an amount of change of a position of the front vehicle from the position information.

Then, the controller 130 compares a variation of an amount of change of steering information and the amount of change of the position of the front vehicle via the determiner 120, and increases or decreases a margin of a shadow zone of the headlamp 2.

As described above, according to the present embodiment, when adjusting the margin of the shadow zone of the headlamp 2, the amount of change of steering information is not simply compared with a preset critical value, rather the amount of change of the position of the front vehicle detected through the camera is compared with the amount of change of the steering information to increase or decrease the margin of the shadow zone of the headlamp 2.

Hereinafter, an apparatus for controlling light distribution using steering information according to another embodiment of the present disclosure will be described in detail.

First, the camera 140 detects an amount of change of a position of a front vehicle through a camera, and when the amount of change of the position of the front vehicle exceeds a predetermined critical value, the determiner 120 determines whether an amount of change of steering information exceeds a predetermined critical value.

When the amount of change of the steering information exceeds the predetermined critical value, a margin of a shadow zone of the headlamp 2, which is located in a direction opposite a direction in which the steering information is changed, is increased or decreased.

For example, when the direction in which the steering information is changed is a counter clockwise direction (−), a margin of a shadow zone of the headlamp 2 corresponding to a right side boundary is increased or decreased, and when the direction in which the steering information is changed is a clockwise direction (+), a margin of a shadow zone of the headlamp 2 corresponding to a left side boundary is increased or decreased.

According to the present embodiment, a time for adjusting the margin of the shadow zone of the headlamp 2 is predicted first by determining the amount of change of the position of the front vehicle, and an area of the margin of the shadow zone of the headlamp 2 is determined by comparing the amount of change of the steering information with the amount of change of the position of the front vehicle so that an adjustment of the margin of the shadow zone of the headlamp 2 is rapidly performed even on a curved road, thereby preventing glare from being given to opposing vehicles while ensuring visibility of a driver.

According to another embodiment of the present disclosure, the above described process may be repeatedly performed a number of times corresponding to the number of front vehicles to determine a shadow zone margin ratio and a direction for each of the vehicles so that accuracy of a setting of the shadow zone may be enhanced.

Figure 5:
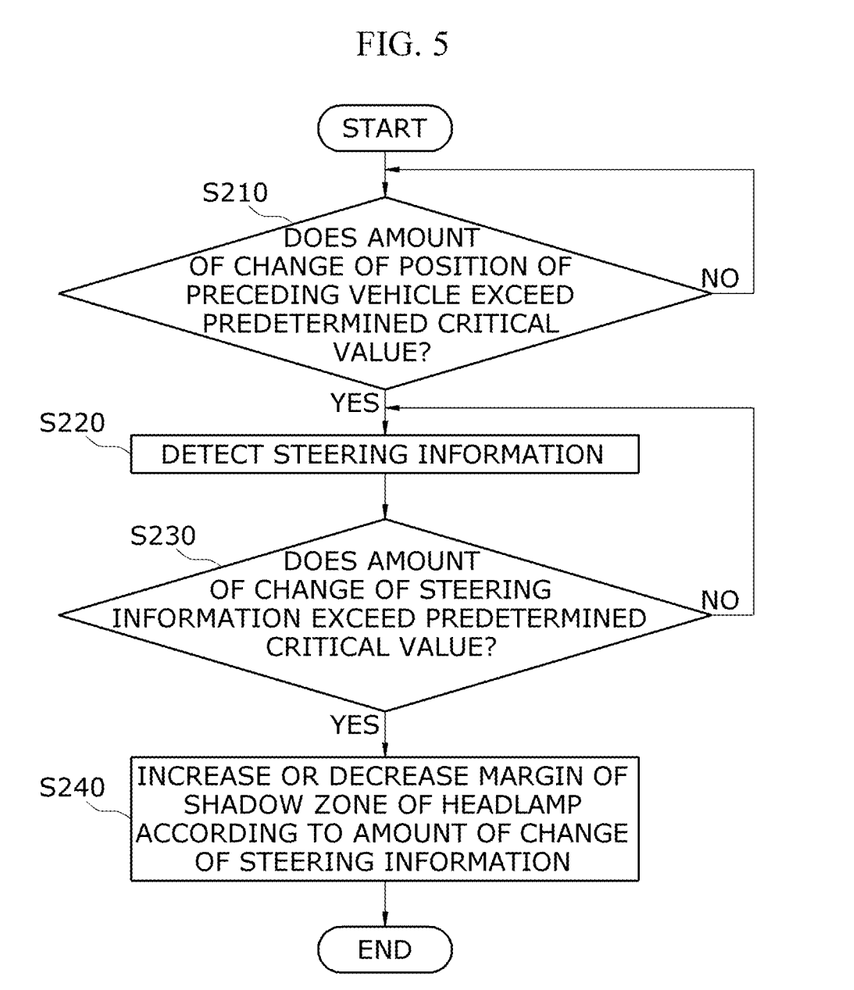
FIG. 5 is a flowchart for describing a method of controlling light distribution using steering information according to another embodiment of the present disclosure.

Hereinafter, a method of controlling light distribution using steering information according to another embodiment of the present disclosure will be described with reference to FIG. 5.

The method of controlling light distribution using steering information according to the present embodiment may, in addition to the construction of the above-described embodiment, further include acquiring position information of a front vehicle, calculating an amount of change of a position of the front vehicle from the acquired position information, and increasing or decreasing a margin of a shadow zone of the headlamp 2 by comparing a variation of an amount of change of steering information and the amount of change of the position of the front vehicle.

First, the camera 140 determines whether an amount of change of a position of a front vehicle detected through a camera exceeds a predetermined critical value (S210).

When the amount of change of the position of the front vehicle is determined to exceed the predetermined critical value in operation S210, whether an amount of change of steering information detected by a steering information detector (S220) exceeds a predetermined critical value is determined (S230).

Meanwhile, when the amount of change of the position of the front vehicle is less than or equal to the predetermined critical value, a current margin of the shadow zone of the headlamp 2 is maintained.

When the amount of change of the steering information is determined to exceed the predetermined critical value in the determining operation of S230 (YES), the margin of the shadow zone of the headlamp 2, which is located in a direction opposite a direction in which the steering information is changed, is increased or decreased (S240).

According to the present embodiment, the controller 130 increases or decreases the margin of the shadow zone corresponding to a right side boundary of the headlamp 2 when the direction in which the steering information is changed is a counter clockwise direction (−), and increases or decreases the margin of the shadow zone corresponding to a left side boundary of the headlamp 2 when the direction in which the steering information is changed is a clockwise direction (+).

According to the present embodiment, a time for adjusting the margin of the shadow zone of the headlamp 2 is predicted first by determining the amount of change of the position of the front vehicle, and an area of the margin of the shadow zone of the headlamp 2 is determined by comparing the amount of change of the position of the front vehicle with the amount of change of the steering information so that the adjustment of the margin of the shadow zone of the headlamp 2 can be rapidly performed even on a curved road, thus preventing glare from being given to opposing vehicles while ensuring visibility of driver.

As is apparent from the above, information about a steering device of a vehicle is detected, and the detected steering information is used to control a margin of a shadow zone of a headlamp so that, even on a curved road on which an aiming position of the headlamp is abruptly changed, the giving of glare to opposing vehicles can be prevented while ensuring vision of a driver.

A time for adjusting a margin of a shadow zone of a headlamp is predicted first by determining an amount of change of a position of a front vehicle and the margin of the shadow zone of an area of the headlamp is determined by comparing the amount of change of the position of the front vehicle with an amount of change of steering information so that an adjustment of the margin of the shadow zone of the headlamp can be rapidly performed even on a curved road, thus preventing glare from being given to opposing vehicles while ensuring visibility of driver.

The above description of the disclosure is for illustrative purposes, and a person having ordinary skilled in the art should appreciate that other specific modifications may be easily made without departing from the technical spirit or essential features of the disclosure. Therefore, the exemplary embodiments disclosed in the present disclosure and the accompanying drawings are intended to illustrate and not limit the technical spirit of the present disclosure, and the scope of the present disclosure is not defined by the detailed description set forth above but by the accompanying claims of the disclosure.

What is claimed is:

1. A system for controlling light distribution using steering information of a vehicle to form a glare free area for avoiding glare to a driver of a preceding vehicle while the headlamp is illuminating a road ahead of the vehicle, the system comprising:
    a headlamp configured to emit a light beam for illuminating a road ahead of the vehicle;
    a steering sensor configured to sense a rotation speed of a steering device of the vehicle;
    a steering information detector configured to detect an amount of change to a steering value representing the rotation speed of the steering device;
    a processor; and
    a computer-readable medium in communication with the processor and storing instructions that, when executed by the processor, cause the processor to control the system to perform:
        comparing a first amount of change to the steering value detected at a first time to a predetermined steering reference value;
        determining, based on the comparison between the detected first amount of change and the predetermined steering reference value, that the first amount of change is not greater than or equal to the predetermined steering reference value;
        in response to determining that the detected first amount of change is not greater than or equal to the predetermined steering reference value, controlling the headlamp to maintain the glare free area without expanding or reducing the glare free area;
        comparing a second amount of change to the steering value detected at a second time subsequent to the first time to the predetermined steering reference value;
        determining, based on the comparison between the second amount of change and the predetermined steering reference value, that the detected second amount of change is greater than or equal to the predetermined steering reference value; and
        in response to determining that the detected second amount of change is greater than or equal to the predetermined steering reference value, controlling the headlamp to expand or reduce the glare free area between a basic margin and a maximum margin based on the second amount of change,
    wherein, for controlling the headlamp to expand or reduce the glare free area, the instructions, when executed by the processor, further cause the processor to control the system to perform at least one of:
        controlling the headlamp to expand the glare free area toward the maximum margin at a first rotation speed of the steering device; and
        controlling the headlamp to reduce the glare free area toward the basic margin at a second rotation speed of the steering device that is lower than the first rotation speed.

2. The system of claim 1, wherein the instructions, when executed by the processor, further cause the processor to control the system to perform controlling the headlamp to adjust the glare free area in a direction opposite to a direction in which the steering value is changed.

3. The system of claim 1, further comprising:
a camera configured to acquire position information of the preceding vehicle and calculate an amount of change to a position of the preceding vehicle from the position information of the preceding vehicle,
wherein the instructions, when executed by the processor, further cause the processor to control the system to perform:
determining that the calculated amount of change to the position of the preceding vehicle exceeds a predetermined position change reference value; and
controlling the headlamp to adjust the glare free area further based on the amount of change to the position of the preceding vehicle exceeding the predetermined position change reference value.

4. A method of controlling light distribution of a headlamp using steering information of a vehicle, the method comprising:
controlling the headlamp to emit a light beam to form a glare free area for avoiding glare to a driver of a preceding vehicle while the headlamp is illuminating a road ahead of a vehicle;
detecting a first amount of change to a steering value representing a rotation speed of the steering device sensed at a first time;
comparing the detected first amount of change to a predetermined steering reference value;
determining, based on the comparison between the detected first amount of change and the predetermined steering reference value, that the first amount of change is not greater than or equal to the predetermined steering reference value;
in response to determining that the detected first amount of change is not greater than or equal to the predetermined steering reference value, controlling the headlamp to maintain the glare free area without expanding or reducing the glare free area;
detecting a second amount of change to the steering value sensed at a second time subsequent to the first time;
comparing the second amount of change to the predetermined steering reference value;
determining, based on the comparison between the second amount of change and the predetermined steering reference value, that the second amount of change is greater than or equal to the predetermined steering reference value; and
in response to determining that the detected second amount of change is greater than or equal to the predetermined steering reference value, controlling the headlamp to expand or reduce the glare free area between a basic margin and a maximum margin based on the second amount of change,
wherein controlling the headlamp to expand or reduce the glare free area comprises at least one of:
controlling the headlamp to expand the glare free area toward the maximum margin at a first rotation speed of the steering device; and
controlling the headlamp to reduce the glare free area toward the basic margin at a second rotation speed of the steering device that is lower than the first rotation speed.

5. The method of claim 4, further comprising controlling the headlamp to adjust the glare free area in a direction opposite to a direction in which the steering value is changed.

6. The method of claim 4, further comprising:
acquiring position information of the preceding vehicle and calculating an amount of change to a position of the preceding vehicle from the position information of the preceding vehicle;
determining that the amount of change to the position of the preceding vehicle exceeds a predetermined position change reference value; and
controlling the headlamp to adjust the glare free area further based on the amount of change to the position of the preceding vehicle exceeding the predetermined position change reference value.

7. The system of claim 1, wherein the instructions, when executed by the processor, further cause the processor to control the system to perform:
controlling the headlamp to form a glare free area for avoiding glare to a driver of an opposing vehicle while the headlamp is illuminating the road ahead of the vehicle; and
controlling the headlamp to adjust the glare free area for avoiding glare to the driver of the opposing vehicle based on the detected second amount of change to the steering value.

8. The method of claim 4, further comprising:
controlling the headlamp to form a glare free area for avoiding glare to a driver of an opposing vehicle while the headlamp is illuminating the road ahead of the vehicle; and
controlling the headlamp to adjust the glare free area for avoiding glare to the driver of the opposing vehicle based on the detected second amount of change to the steering value.

* * * * *